(12) United States Patent
Song et al.

(10) Patent No.: US 9,911,990 B2
(45) Date of Patent: Mar. 6, 2018

(54) FUEL CELL STACK INCLUDING END PLATE HAVING INSERTION HOLE

(71) Applicant: Samsung Electronics Co., Ltd., Suwon-si, Gyeonggi-do (KR)

(72) Inventors: Tae-won Song, Yongin-si (KR); Jin-ho Kim, Yongin-si (KR); Jeong-sik Ko, Seongnam-si (KR); Ji-rae Kim, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 295 days.

(21) Appl. No.: 14/264,247

(22) Filed: Apr. 29, 2014

(65) Prior Publication Data
US 2015/0093675 A1    Apr. 2, 2015

(30) Foreign Application Priority Data
Oct. 1, 2013    (KR) ........................ 10-2013-0117593

(51) Int. Cl.
*H01M 8/04*    (2016.01)
*H01M 8/24*    (2016.01)
*H01M 8/04082*    (2016.01)
*H01M 8/2465*    (2016.01)
*H01M 8/1018*    (2016.01)

(52) U.S. Cl.
CPC ..... *H01M 8/04201* (2013.01); *H01M 8/2465* (2013.01); *H01M 2008/1095* (2013.01)

(58) Field of Classification Search
CPC ...... H01M 8/04; H01M 8/04201; H01M 8/24; H01M 8/2465
See application file for complete search history.

(56) References Cited

U.S. PATENT DOCUMENTS

| | | | |
|---|---|---|---|
| 7,338,728 | B2 | 3/2008 | Ismaier et al. |
| 7,560,181 | B2 | 7/2009 | Lee et al. |
| 7,579,099 | B2 | 8/2009 | Lee et al. |
| 7,914,940 | B2 | 3/2011 | Shin et al. |
| 7,947,409 | B2 | 5/2011 | Park et al. |
| 8,003,271 | B2 | 8/2011 | Song et al. |
| 8,034,501 | B2 | 10/2011 | Lee et al. |

(Continued)

FOREIGN PATENT DOCUMENTS

| | | |
|---|---|---|
| KR | 1020050020380 A | 3/2005 |
| KR | 1020060071556 A | 6/2006 |

(Continued)

OTHER PUBLICATIONS

Jian Wen et al., Study of flow distribution and its improvement on the header of plate-fin heat exchanger, 2004, pp. 823-831, Science Direct, ELSEVIER.

*Primary Examiner* — Karie O'Neill Apicella
(74) *Attorney, Agent, or Firm* — Cantor Colburn LLP

(57) ABSTRACT

A fuel cell stack includes a stack including a plurality of unit cells, which is stacked on one another in a predetermined direction, first and second end plates disposed on opposing ends of the stack, and a supply line disposed on a first surface of the first end plate to supply fuel or air to the plurality of unit cells, where an insertion hole is defined in a second surface of the first end plate to be adjacent to the supply line, and the second surface of the first end plate is substantially perpendicular to the first surface of the first end plate.

20 Claims, 11 Drawing Sheets

(56) References Cited

U.S. PATENT DOCUMENTS

| | | | |
|---|---|---|---|
| 8,148,034 B2 | 4/2012 | Park et al. | |
| 8,227,132 B2 * | 7/2012 | Kim | H01M 8/0269 |
| | | | 429/452 |
| 8,329,358 B2 | 12/2012 | Peng et al. | |
| 8,343,677 B2 | 1/2013 | Song et al. | |
| 8,343,681 B2 | 1/2013 | Peng et al. | |
| 8,372,552 B2 | 2/2013 | Sun et al. | |
| 8,470,491 B2 | 6/2013 | Miller et al. | |
| 8,512,904 B2 | 8/2013 | Oh et al. | |
| 8,518,589 B2 | 8/2013 | Song et al. | |
| 8,771,894 B2 | 7/2014 | Shin et al. | |
| 2005/0109434 A1 | 5/2005 | Seung et al. | |
| 2008/0032179 A1 | 2/2008 | Song et al. | |
| 2008/0050638 A1 | 2/2008 | Peng et al. | |
| 2008/0090123 A1 | 4/2008 | Peng et al. | |
| 2008/0159069 A1 | 7/2008 | Mies et al. | |
| 2009/0017343 A1 | 1/2009 | Song et al. | |
| 2009/0162713 A1 | 6/2009 | Peng et al. | |
| 2010/0143756 A1 | 6/2010 | Heo et al. | |
| 2010/0167097 A1 | 7/2010 | Heo et al. | |
| 2010/0286939 A1 | 11/2010 | Oh et al. | |
| 2011/0223522 A1 | 9/2011 | Kim et al. | |
| 2012/0028156 A1 | 2/2012 | Song et al. | |
| 2012/0070761 A1 | 3/2012 | Goebel | |
| 2012/0107704 A1 | 5/2012 | Chin | |
| 2012/0171592 A1 | 7/2012 | Song et al. | |
| 2012/0183871 A1 | 7/2012 | Kim et al. | |
| 2013/0236800 A1 | 9/2013 | Song et al. | |
| 2014/0099563 A1 | 4/2014 | Song et al. | |
| 2014/0162165 A1 | 6/2014 | Song et al. | |
| 2015/0064595 A1 | 3/2015 | Kim et al. | |

FOREIGN PATENT DOCUMENTS

| | | |
|---|---|---|
| KR | 1020070034855 A | 3/2007 |
| KR | 100718113 B1 | 5/2007 |
| KR | 100738063 B1 | 7/2007 |
| KR | 100745738 B1 | 7/2007 |
| KR | 100745742 B1 | 7/2007 |
| KR | 100790901 B1 | 12/2007 |
| KR | 1020070117841 A | 12/2007 |
| KR | 100803198 B1 | 2/2008 |
| KR | 1020080011920 A | 2/2008 |
| KR | 1020080012016 A | 2/2008 |
| KR | 100813246 B1 | 3/2008 |
| KR | 100813274 B1 | 3/2008 |
| KR | 100813275 B1 | 3/2008 |
| KR | 1020090006593 A | 1/2009 |
| KR | 1020090068731 A | 6/2009 |
| KR | 1020090072536 A | 7/2009 |
| KR | 1020090078550 A | 7/2009 |
| KR | 1020090113561 A | 11/2009 |
| KR | 1020090126979 A | 12/2009 |
| KR | 1020100063994 A | 6/2010 |
| KR | 1020100069489 A | 6/2010 |
| KR | 1020100076799 A | 7/2010 |
| KR | 1020100121354 A | 11/2010 |
| KR | 1020110103207 A | 9/2011 |
| KR | 1020120012303 A | 2/2012 |
| KR | 1020120078393 A | 7/2012 |
| KR | 1020120082188 A | 7/2012 |
| KR | 1020120085027 A | 7/2012 |
| KR | 1020130027743 A | 3/2013 |
| KR | 1020130102403 A | 9/2013 |
| KR | 1020140046336 A | 4/2014 |
| KR | 1020140075465 A | 6/2014 |
| KR | 101544479 B1 | 8/2015 |

* cited by examiner

FUEL CELL STACK INCLUDING END PLATE HAVING INSERTION HOLE

CROSS-REFERENCE TO RELATED APPLICATIONS

This application claims priority to Korean Patent Application No. 10-2013-0117593, filed on Oct. 1, 2013, and all the benefits accruing therefrom under 35 U.S.C. § 119, the content of which in its entirety is herein incorporated by reference.

BACKGROUND

1. Field

The disclosure relates to a fuel cell stack, and more particularly, to a fuel cell stack including an end plate having an insertion hole, configured to allow insertion structures having various functions to be attached to a supply line of the fuel cell stack from the outside of the fuel cell stack.

2. Description of the Related Art

A fuel cell is a device for directly converting chemical energy of fuel into electric energy by electrochemical reactions, which are a kind of generator that continuously generates electricity while the fuel is being supplied. When air including oxygen is supplied to a cathode and fuel, such as methanol and hydrogen, is supplied to an anode in such a fuel cell, an electrochemical reaction occurs through an electrolyte film between the cathode and anode, thereby generating electricity.

Generally, since electricity generated at a unit cell of a fuel cell is not high in a voltage as much as being useful, the fuel cell typically includes a stack of unit cells, in which several unit cells are connected in series. On both ends of such a fuel cell stack, end plates are disposed to firmly fix the unit cells. In such a fuel cell stack, air and fuel for an electrochemical reaction may be supplied to the unit cells through an end plate on one side thereof and residual air and fuel may be discharged through an end plate on another side thereof. In such a fuel cell stack, air and fuel may be supplied to a membrane electrode assembly ("MEA") defined by a cathode, an anode and an electrolyte film through manifolds and channels formed in an end plate, for example.

SUMMARY

According to an embodiment of the invention, a fuel cell stack includes a stack including a plurality of unit cells, which is stacked on one another in a predetermined direction, first and second end plates disposed on opposing ends of the stack, and a supply line disposed on a first surface of the first end plate to supply fuel or air to the plurality of unit cells, where an insertion hole is defined in a second surface of the first end plate to be adjacent to the supply line, where the second surface of the first end plate is substantially perpendicular to the first surface of the first end plate.

In an embodiment, the first end plate may include a manifold connected to the supply line, where the manifold may function as a path for the fuel or air, and the insertion hole may be defined adjacently to the manifold to allow a portion of the manifold to be open outward.

In an embodiment, the fuel cell stack may further include an insertion structure configured to be inserted into and detached from the insertion hole, where the insertion structure is disposed in the manifold when the insertion structure is inserted into the insertion hole.

In an embodiment, the insertion structure may include a frame having substantially the same shape as an inlet of the insertion hole to which the insertion structure is inserted into and which is fastened to the insertion hole.

In an embodiment, the insertion structure may further include a linear or plate shaped sealing member disposed on a circumference of the frame to isolate the inside of the fuel cell stack from the outside.

In an embodiment, the insertion structure may include a flow distributor configured to allow a flow velocity of air or fuel in the manifold to be substantially uniform.

In an embodiment, the flow distributor may include a first penetration hole portion extending from the frame to be disposed in the manifold when the insertion structure is inserted into the insertion hole and second penetration hole portions disposed on opposing sides of the first penetration hole, respectively.

In an embodiment, the first penetration hole portion may have an inlet having a smaller width than an outlet and each of the second penetration hole portions may have an inlet having a greater width than an outlet.

In an embodiment, the flow distributor may have at least one of a mesh structure, a cross-rib structure, a sponge structure, a multi-hole plate structure, and a porous plate structure.

In an embodiment, the flow distributor may include a plurality of airfoils fastened to the frame and configured to be rotatable and a control lever for controlling a rotational angle of the plurality of airfoils, where the plurality of airfoils and the control lever may be disposed opposite to each other with the frame disposed therebetween, the plurality of airfoils is disposed in air or fuel inlet in the manifold when the insertion structure is inserted into the insertion hole, and the control lever is protruded outwardly from the first end plate.

In an embodiment, the insertion structure may further include a material supply/removal unit for directly supplying an additional material to the fuel or removing the additional material from the fuel, where the material supply/removal unit may include a supply pipe perpendicularly extending and protrude from the frame, a plurality of guide bars extending from the supply pipe in a longitudinal direction of the insertion structure, and an inlet defined in the frame to allow a material to be supplied into the supply pipe. In such an embodiment, a hole for discharging the material may be defined on a portion of the supply pipe connected to the plurality of guide bars, and the inlet and the supply pipe may be disposed to face each other on opposite sides of the frame to allow the supply pipe to be disposed in the manifold and to allow the inlet to be exposed outward from the first end plate when the insertion structure is inserted into the insertion hole.

In an embodiment, the supply line may be disposed substantially perpendicularly to a stacking direction of the unit cells, and the insertion hole may be defined substantially in a same direction as the stacking direction of the unit cells.

In an embodiment, the insertion structure may include a flow distribution plate configured to be disposed to be inclined toward the supply line and the manifold when the insertion structure is inserted into the insertion hole.

In an embodiment, a bottom surface or a top surface of the insertion hole may be connected to a top surface or a bottom surface of the manifold.

In an embodiment, the fuel cell stack may further include an insertion structure configured to be inserted into and detached from the insertion hole. In such an embodiment, the insertion structure may include at least two guide slots and at least two fuel distributors configured to be slidable in the at least two guide slots, respectively, where the at least two fuel distributors may be disposed in the manifold by sliding to be protruded from the insertion structure when the insertion structure is inserted into the insertion hole.

In an embodiment, each of the at least two fuel distributors may include a bar-shaped protrusion protruding from the first end plate when the insertion structure is inserted into the insertion hole.

In an embodiment, the fuel cell stack may further include a common plate disposed between the plurality of unit cells, where the fuel cell stack may be divided into a first fuel cell stack including a plurality of unit cells between the first end plate and the common plate and a second fuel cell stack including a plurality of unit cells between the common plate and the second end plate.

In an embodiment, the common plate may include a channel for transmitting the fuel or air between the first fuel cell stack and the second fuel cell stack, and an insertion hole is defined in the common plate to be adjacent to the channel on a side of the common plate to allow a side of the channel to be open outward.

In an embodiment, the fuel cell stack may include a first insertion structure configured to be inserted into and detached from the insertion hole of the common plate, where a penetration hole is defined through the first insertion structure to allow the channel to be open when the first insertion structure is inserted into the insertion hole of the common plate, and a second insertion structure configured to be inserted and detached from the insertion hole and including a barrier to allow the channel to be closed when the second insertion structure is inserted into the insertion hole of the common plate.

In an embodiment, the supply line may be disposed substantially in a same direction as a stacking direction of the unit cells, and the insertion hole may be defined substantially to be substantially perpendicular to the stacking direction of the unit cells.

In an embodiment, the fuel cell stack may further include a discharge line disposed on a first surface of the second end plate to discharge the fuel or air from the plurality of unit cells, and an insertion hole may be defined adjacently to the discharge line on a second surface, which is substantially perpendicularly to the first surface of the second end plate.

BRIEF DESCRIPTION OF THE DRAWINGS

These and/or other features of the disclosure will become apparent and more readily appreciated from the following description of embodiments of the invention, taken in conjunction with the accompanying drawings, in which.

DETAILED DESCRIPTION

Figure 1:
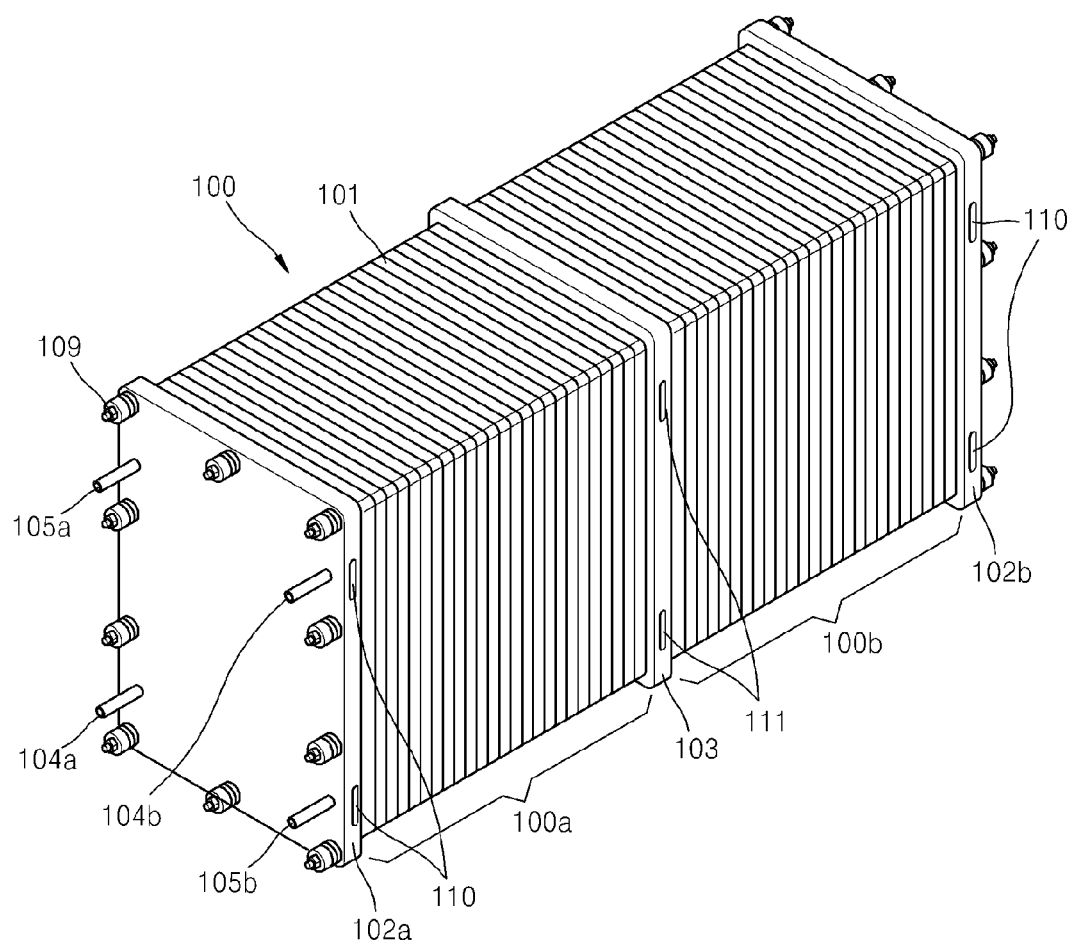
FIG. 1 is a schematic perspective view illustrating a configuration of an embodiment of a fuel cell stack according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the invention are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a fuel cell stack including an end plate in which an insertion hole is defined will be described in detail with reference to the attached drawings.

FIG. 1 is a schematic perspective view illustrating a configuration of an embodiment of a fuel cell stack 100 according to invention. Referring to FIG. 1, an embodiment of the fuel cell stack 100 may include a plurality of unit cells 101 stacked on one another in one direction and a pair of end plates 102a and 102b disposed respectively on both ends of a stack of the plurality of unit cells 101. The unit cell 101 is a unit fuel cell that generates electric energy using an electrochemical reaction between fuel and an oxidant. In an embodiment, the plurality of unit cells 101 is connected in series, such that the fuel cell stack 100 may generate electric energy in high voltage. The end plates 102 and 102b fix the plurality of unit cells 101 to allow the plurality of unit cells 101 to maintain the position thereof in the stack, and supply fuel and air to the plurality of unit cells 101. In such an embodiment, the pair of end plates 102a and 102b may be firmly fastened to each other using a fastening element 109 while disposing the plurality of unit cells 101 therebetween.

In such an embodiment, manifolds 106 (shown in FIG. 4), which are paths for supplying fuel and air to the unit cells 101 and discharging the fuel and air from the unit cells 101, may be defined or formed in the end plates 102a and 102b. In such an embodiment, an air supply line 104a, an air discharge line 104b, a fuel supply line 105a and a fuel discharge line 105b may be disposed in a first end plate 102a. Accordingly, in such an embodiment, the air and fuel provided from the air supply line 104a and the fuel supply line 105a to the first end plate 102a may be supplied to the unit cells 101 through the manifolds 106 corresponding thereto. In an embodiment, residual air and fuel may be discharged through the air discharge line 104b and the fuel discharge line 105b. In an alternative embodiment, the air supply line 104a and the fuel supply line 105a may be disposed in the first end plate 102a, and the air discharge line 104b and the fuel discharge line 105b may be disposed in the second end plate 102b. Accordingly, in such an embodiment, the air and fuel provided from the air supply line 104a and the fuel supply line 105a to the first end plate 102a may be supplied to the unit cells 101 through the manifolds 106 corresponding thereto. In such an embodiment, residual air and fuel may be discharged through the air discharge line 104b and the fuel discharge line 105b disposed in the second end plate 102b.

In an embodiment, the plurality of unit cells 101 may define a single stack, but not being limited thereto. In an alternative embodiment, as shown in FIG. 1, a common plate 103 may be disposed between the unit cells 101 to divide the fuel cell stack 100 into a plurality of stacks. In one embodiment, for example, the fuel cell stack 100 includes a single common plate 103, as shown in FIG. 1. In such an embodiment, the fuel cell stack 100 may be divided into a first fuel cell stack 100a, in which a plurality of unit cells 101 are stacked, and a second fuel cell stack 100b, in which a plurality of other unit cells 101 are stacked, by the common plate 103.

In an embodiment, insertion holes 110 and 111, into which an insertion structure for performing a certain function may be inserted, may be defined or formed in the end plates 102a and 102b and the common plate 103. In one embodiment, for example, the insertion hole 110 may be defined on sides of the end plates 102a and 102b, and the insertion hole 111 may be defined on a side of the common plate 103. In such an embodiment, as described above, the insertion holes 110 and 111 accessible from the outside are defined in outer surfaces of the end plate 102a and 102b and the common plate 103, thereby allowing various insertion structures for controlling operations of the fuel cell stack 100 to be easily attached and detached. The insertion holes 110 and 111 may be defined selectively in at least one of the two end plates 102a and 102b and the common plate 103 or may be defined in all thereof. In an embodiment, the insertion holes 110 and 111 may be adjacent to the air discharge line 104b and the fuel supply line 105b as shown in FIG. 1, but not being limited thereto. In an alternative embodiment, the insertion holes 110 and 111 may be defined on a side of the common plate 103 near the air supply line 104a and the fuel discharge line 105a on the opposite side. Hereinafter, for convenience of description, the insertion hole 110 adjacent to the fuel supply line 104a of the first end plate 102a will be described in detail. In such an embodiment, the insertion hole 110 may be defined on a side of the common plate 103 to be adjacent to the air discharge line 104b, the fuel supply line 105a or the fuel discharge line 105b.

Figure 2:
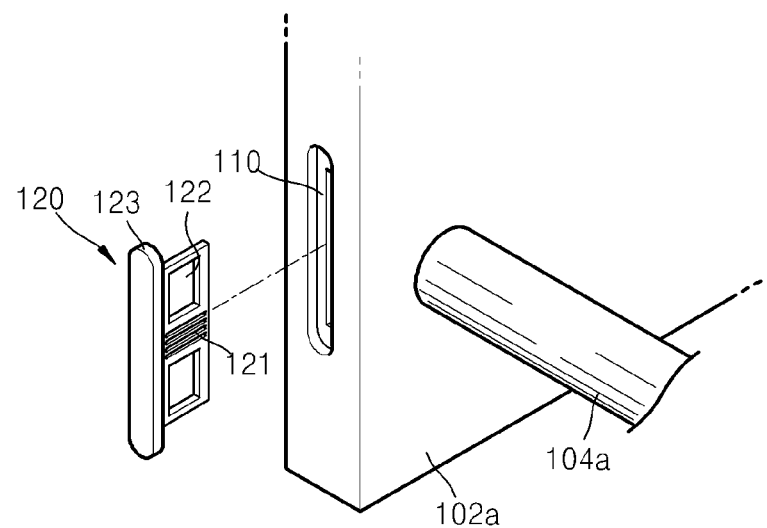
FIG. 2 is a perspective view illustrating an embodiment of an insertion structure detachable from an insertion hole of an end plate of the fuel cell stack of FIG. 1.

The insertion structure to be inserted into the insertion holes 110 and 111 may be variously selected. FIG. 2 is a perspective view illustrating an embodiment of an insertion structure 120 detachable from, that is, configured to be inserted into and detached from, the insertion hole 110 of the first end plate 102a of the fuel cell stack 100. Referring to FIG. 2, the insertion structure 120 may be a flow distributor for improving flow distribution inside the fuel cell stack 100.

Generally, when the fuel cell stack 100 include a large number of unit cells 101, supply of air or fuel is typically controlled to allow a same amount of air or fuel is supplied to the respective unit cells 101, to thereby allow the large number of unit cells 101 to perform a uniform function. However, as the number of unit cells 101 increases, a flow of the air or fuel increases. Due to such an increase in a flow of the air or fuel, a distortion of a flow velocity such as a separated flow may occur at an inlet of the air or fuel, and an operational degradation may thereby occur in some unit cells 101 due to a lack of flow. The insertion structure 120 may be installed in the manifold 106 through the insertion hole 110 of the first end plate 102a to allow a flow velocity of a fluid of the air or fuel at the inlet to be substantially uniform.

In an embodiment, the insertion hole 110 may be disposed adjacently to the air supply line 104a such that the insertion structure 120 may be effectively disposed to overlap the manifold 106 of the first end plate 102a when the insertion structure 120 is inserted into the insertion hole 110. In an embodiment, as shown in FIG. 2, the insertion hole 110 may have a surface perpendicularly adjacent to a surface of the first end plate 102a, to which the air supply line 104a is connected. In such an embodiment, when the air supply line 104a is disposed substantially parallel to a stacking direction of the unit cells 101, the air supply line 104a may be connected to a front of the first end plate 102a and the insertion hole 110 may be defined or formed adjacently to the air supply line 104a to be perpendicular to the stacking direction of the unit cells 101 on the side of the first end plate 102a. A side of the manifold 106 of the first end plate 102a may be open outward by the insertion hole 110. Accordingly, the insertion structure 120 inserted into the insertion hole 110 may be located in a fuel inlet of the manifold 106.

In an embodiment, as shown in FIG. 2, the insertion structure 120 may include a frame 123 having substantially the same shape as an inlet of the insertion hole 110 to be inserted into and fastened to the insertion hole 110. In an embodiment, a sealing member for isolating the inside of the fuel cell stack 100 from the outside, for example, the manifold 106, may be disposed on a circumference of the frame 123 having a linear shape or a plate shape. Accordingly, the frame 123 of the insertion structure 120 may be inserted into the inlet of the insertion hole 110 with substantially no gap. The sealing member may include or be formed of, for example, rubber, metal, or a composite resin having elasticity.

Figure 3:
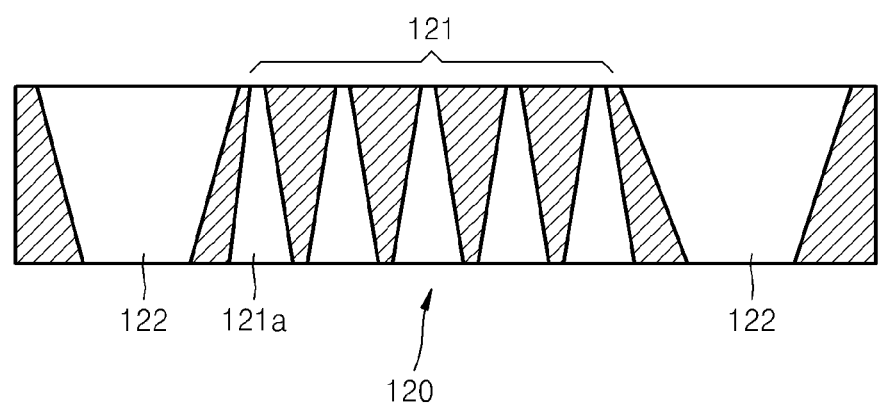
FIG. 3 is a cross-sectional view illustrating a configuration of an embodiment of the insertion structure of FIG. 2.

In an embodiment, the insertion structure 120 may further include first and second penetration hole portions 121 and 122 extending from the frame 123 and configured to be inserted into the manifold 106 when the insertion structure 120 is inserted into the inversion hole 110. The first penetration hole portion 121 may reduce a flow velocity in a central area of a fluid, and the second penetration hole portions 122 defined on both sides of the first penetration hole portion 121 may increase a flow velocity in a peripheral area of the fluid. In one embodiment, for example, inner surfaces of the first and second penetration hole portions 121 and 122 are inclined surfaces, as shown in FIG. 3. The second penetration hole portion 122 may have a shape of an enlargement pipe with an inlet having a width broader than a width of an outlet thereof. In such an embodiment, the first penetration hole portion 121 may have a shape of a reduction pipe and a plurality of parallel holes 121a may defined therethrough with an inlet having a width narrower than a width of an outlet thereof. According to Bernoulli's theorem, a flow velocity of a fluid passing through the second penetration hole portion 122 increases and a flow velocity of the fluid passing through the first penetration hole portion 121 decreases. Accordingly, a difference between the flow velocities of the fluid in areas corresponding to the first and second penetration hole portions 121 and 122 may be reduced.

Figure 4:
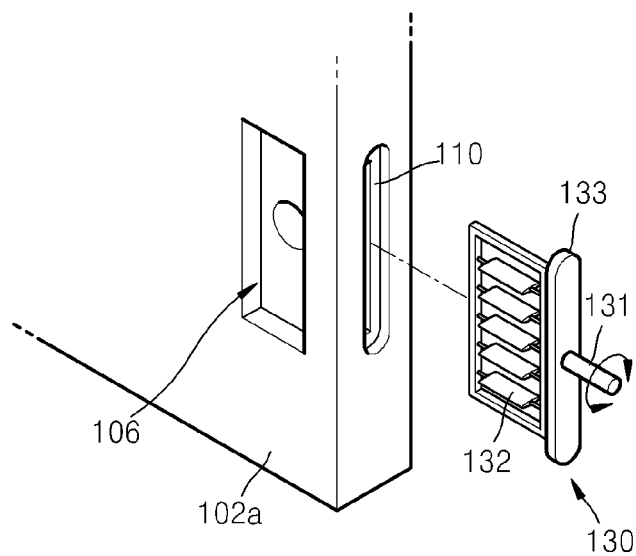
FIG. 4 is a perspective view illustrating an alternative embodiment of the insertion structure detachable from the insertion hole of the end plate of the fuel cell stack of FIG. 1.

FIG. 4 is a perspective view illustrating an alternative embodiment of the insertion structure 130 detachable from the insertion hole 110 of the first end plate 102a of the fuel cell stack 100. The insertion structure 130 shown in FIG. 4 is a flow distributor for improving flow distribution in the fuel cell stack 100 and has an airfoil cascade shape. In one embodiment, for example, the insertion structure 130 may include a frame 133 having a same shape as the inlet of the insertion hole 110, a plurality of airfoils 132 connected, e.g., fastened, to the frame 133 and configured to be rotatable, and a control lever 131 for controlling a rotational angle of the airfoils 132. The plurality of airfoils 132 and the control lever 131 are disposed opposite to each other with the frame 133 disposed therebetween. Accordingly, when the insertion structure 130 is installed in the insertion hole 110, the plurality of airfoils 132 are located in air or fuel inlet of the manifold 106, and the control lever 131 is located to protrude outward from the side of the first end plate 102a.

Figure 5A:
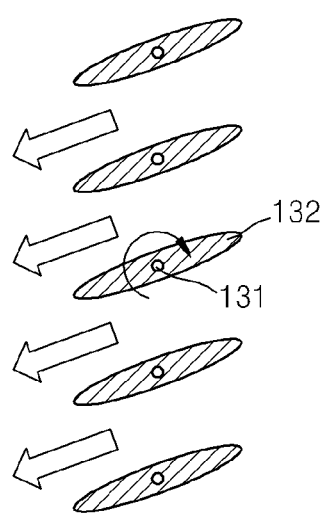
FIGS. 5A and 5B are concept views schematically illustrating operations of the insertion structure of FIG. 4.
Figure 5B:
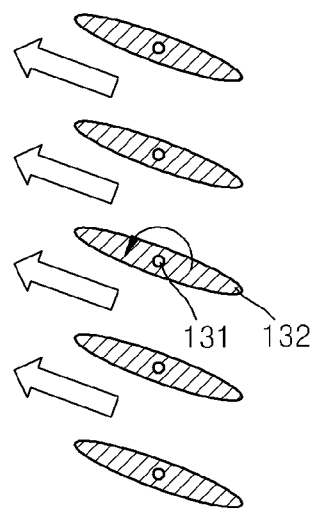

FIGS. 5A and 5B are concept views schematically illustrating operations of the insertion structure of FIG. 4. According to an embodiment, the control lever 131 is manually or automatically operated outside the fuel cell stack 100, thereby easily controlling the angle of the airfoils 132 in the manifold 106 as shown in FIGS. 5A and 5B. The plurality of airfoils 132 generates a wake in the fluid in the manifold 106, thereby performing the flow distribution. Since a direction of the wake varies with the angle of the airfoils 132, the angle of the airfoils 132 may be effectively controlled based on a change in an operational condition such as a flow and a flow velocity.

Figure 6:
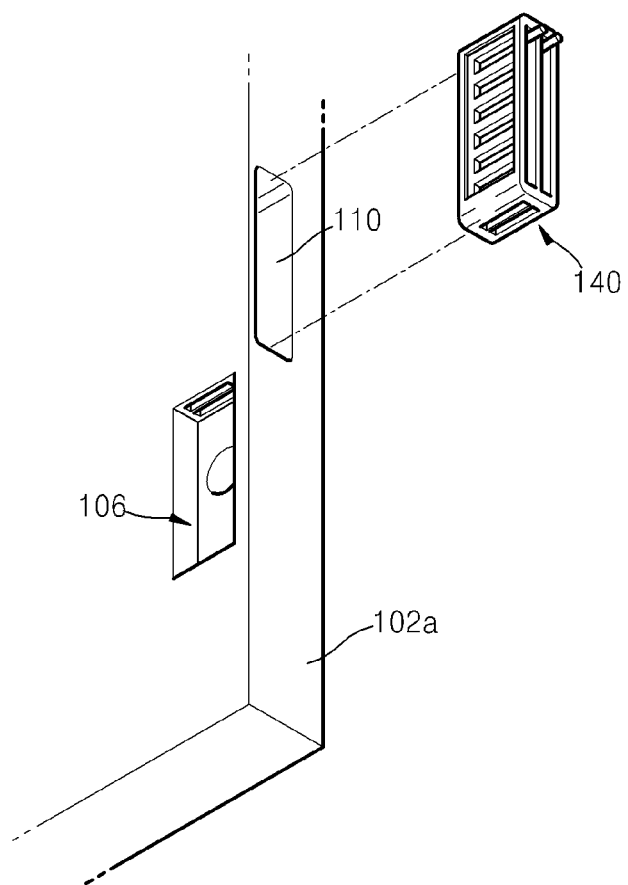
FIG. 6 is a perspective view illustrating another alternative embodiment of the insertion structure detachable from the insertion hole of the end plate of the fuel cell stack of FIG. 1.

FIG. 6 is a perspective view illustrating another alternative embodiment of the insertion structure 140 detachable from the insertion hole 110 of the first end plate 102a of the fuel cell stack 100. In an embodiment, as described above, the insertion hole 110 may be defined at the same height as the manifold 106 on the side of the first end plate 102a in such a way that the manifold 106 is exposed or directly open outward through the side of the first end plate 102a. In an alternative embodiment, as shown in FIG. 6, the insertion hole 110 may be defined at a different height from the manifold 106. In one embodiment, for example, the insertion hole 110 may be defined or provided to allow a bottom surface of the insertion hole to be connected to a top surface of the manifold 106. In an alternative embodiment, the insertion hole 110 is disposed below the manifold 106 to allow a top surface of the insertion hole 110 to be connected to a bottom surface of the manifold 106. In such embodiments, the manifold 106 may be indirectly open outward in a direction of the side of the first end plate 102a through the top surface or bottom surface thereof.

Figure 7:
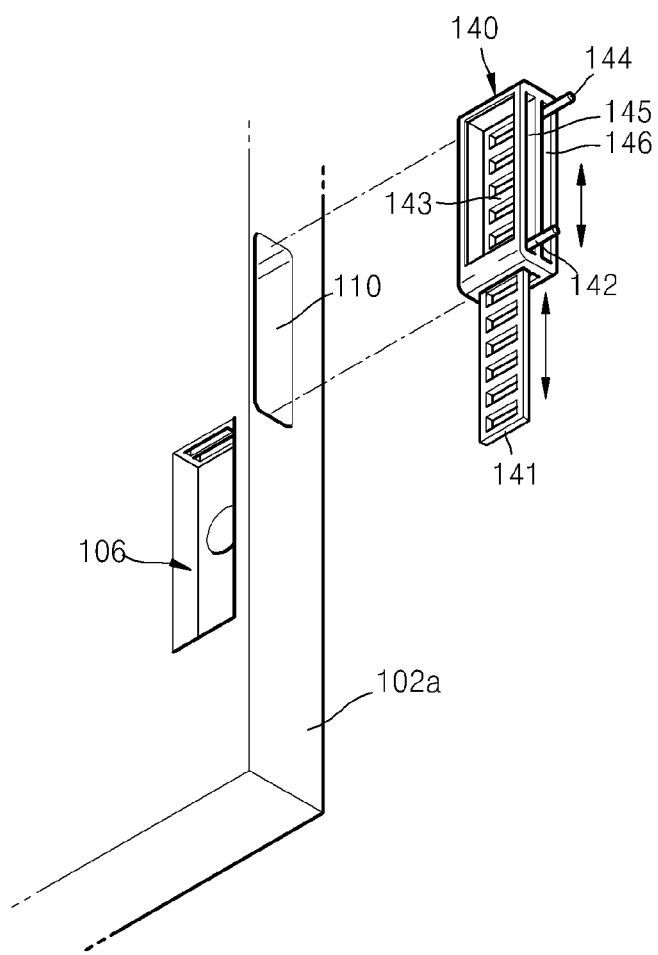
FIGS. 7 and 8 are concept views schematically illustrating operations of the insertion structure of FIG. 6.

In an embodiment, as shown in FIG. 7, the insertion structure 140 detachable from the insertion hole 110 may include a plurality of slidable flow distributors, e.g., at least two different slidable flow distributors 141 and 143.

Figure 8:
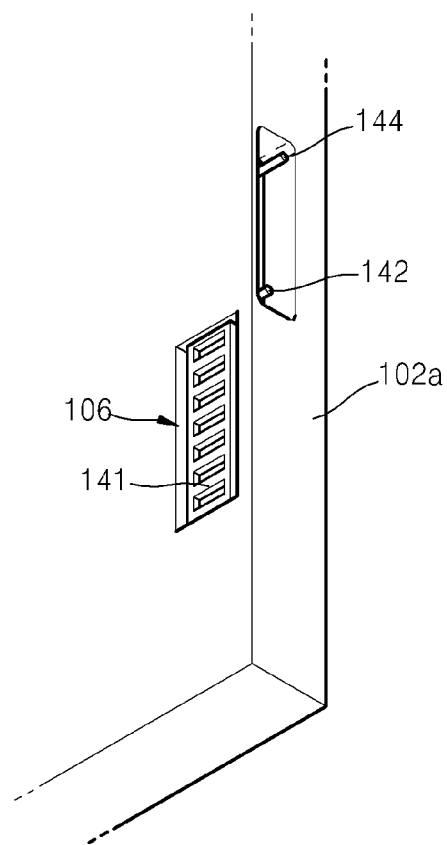

FIGS. 7 and 8 are concept views schematically illustrating operations of the insertion structure of FIG. 6. Referring to FIG. 7, the insertion structure 140 may include two flow distributors, e.g., a first flow distributor 141 and a second flow distributor 143, disposed in two guide slots, e.g., a first guide slot 145 and a second guide slot 146, respectively. In an embodiment, as shown in FIG. 7, only the first flow distributor 141 protrudes from the insertion structure 140 and the second flow distributor 143 is retracted in the insertion structure 140. In an embodiment, as shown in FIG. 7, the insertion structure 140 may include only the two guide slots 145 and 146 and the flow distributors 141 and 143, but the invention is not limited thereto. The numbers of the guide slots 145 and 146 and the flow distributors 141 and 143 may be variously modified.

The flow distributors 141 and 143 may be slidable up and down in the guide slots 145 and 146. In one embodiment, for example, the first flow distributor 141 slides downwardly, such that the first flow distributor 141 having a plurality of penetration holes may protrude downwardly from the insertion structure 140. Accordingly, in such an embodiment, when the first flow distributor 141 slides downwardly while the insertion structure 140 is being mounted on the insertion hole 110, the first flow distributor 141 is located in the fuel inlet of the manifold 106. In an embodiment, as shown in FIG. 7, the first flow distributor 141 may have a grid pattern structure including a plurality of penetration holes having a tetragonal shape, but not being limited thereto. In an alternative embodiment, the first flow distributor 141 may have various shapes such as a mesh structure, a cross-rib structure, a sponge structure, a multi-hole plate structure, and a porous plate structure, a plate with nozzle and diffuser structure. The first flow distributor 141 and the second flow distributor 143 may have different structures from each other.

Referring to FIG. 8, in an embodiment, the flow distributors 141 and 143 may include bar-shaped protrusions 142 and 144 that may protrude from the side of the first end plate 102a, respectively. Accordingly, in such an embodiment, the bar-shaped protrusions 142 and 144 may be manually or automatically moved, thereby controlling positions of the flow distributors 141 and 143 in the manifold 106, respectively. In such an embodiment, by controlling positions of the flow distributors 141 and 143 in the manifold 106, only the first flow distributor 141 may be disposed in the manifold 106, only the second flow distributor 143 may be disposed in the manifold 106, both the first flow distributor 141 and the second flow distributor 143 may be disposed in the manifold 106, or both of them may be removed from the manifold 106. In such an embodiment, a part of the first flow distributor 141 or a part of the second flow distributor 143 may be disposed in the manifold 106. In such an embodiment, the positions of the flow distributors 141 and 143 may be appropriately controlled based on the change in the operational condition such as the flow and flow velocity.

Figure 9A:
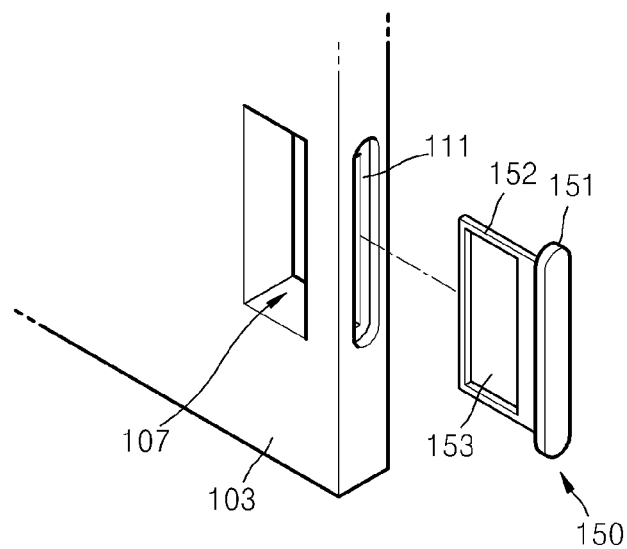
FIGS. 9A and 9B are perspective views illustrating other alternative embodiments of the insertion structures detachable from an insertion hole of a common plate of the fuel cell stack of FIG. 1.
Figure 9B:
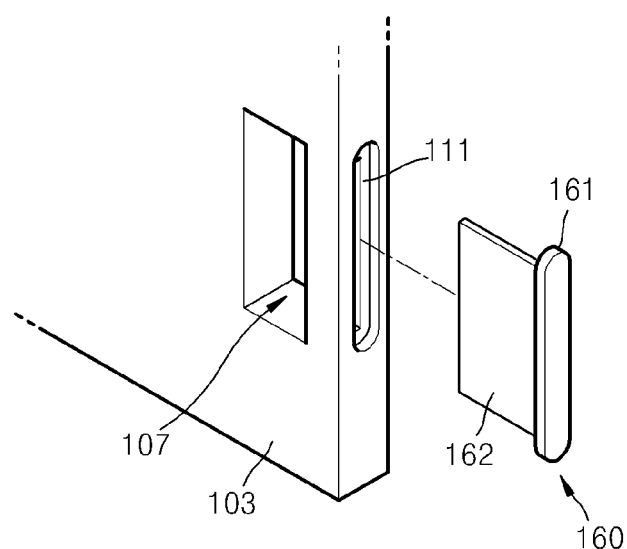

FIGS. 9A and 9B are perspective views illustrating other alternative embodiments of the insertion structures 150 and 160 detachable from an insertion hole 111 of a common plate 103 of the fuel cell stack 100.

Referring to FIG. 9A, in an embodiment, the insertion hole 111 of the common plate 103 may be defined or formed on a side of the common plate 103. As described above, the common plate 103 divides the fuel cell stack 100 into the first fuel cell stack 100a and the second fuel cell stack 100b. In the common plate 103, a manifold 107 is defined or formed to transmit fuel and air between the first fuel cell stack 100a and the second fuel cell stack 100b. The insertion hole 111 may be defined or formed adjacently to the manifold 107 on the side of the common plate 103. In such an embodiment, the manifold 107 of the common plate 103 may be open outward by the insertion hole 111. Accordingly, the insertion structure 150 inserted into the insertion hole 111 may be located in the manifold 107.

The insertion structure 150 shown in FIG. 9A may include a frame 151 having substantially the same shape as an inlet of the insertion hole 111 to be inserted into and fastened to the insertion hole 111. In such an embodiment, a sealing member for isolating the manifold 107 from the outside may be disposed or provided on a circumference of the frame 151. Accordingly, the frame 151 of the insertion structure 150 may be inserted into the inlet of the insertion hole 111 with no gap. In such an embodiment, the insertion structure 150 may further include an opening portion 152 extending from the frame 151 to be inserted into the manifold 107. In such an embodiment, one large penetration hole 153 may be defined or formed in the opening portion 152. Accordingly, when the insertion structure 150 is inserted into the common plate 103, the opening portion 152 is located in the manifold 107, such that the manifold 107 is in an open state. In such an embodiment, when the insertion structure 150 is inserted into the common plate 103, fuel or air in the first fuel cell stack 100a may pass through the manifold 107 and may be transmitted to the second fuel cell stack 100b. Accordingly, when a large output is necessary, the insertion structure 150 shown in FIG. 9A is inserted into the common plate 103, thereby using both the first fuel cell stack 100a and the second fuel cell stack 100b.

In an alternative embodiment, as shown in FIG. 9B, the insertion structure 160 may include a frame 161 inserted into and fastened to the insertion hole 111 and a barrier 162 perpendicularly extended from the frame 161. When the insertion structure 160 is inserted into the common plate 103, the barrier 162 is located in the manifold 107. Accordingly, when the insertion structure 160 is inserted into the common plate 103, the manifold 107 is in a closed state. In such an embodiment, when the insertion structure 160 is inserted into the common plate 103, the fuel or air in the first fuel cell stack 100a is not transmitted to the second fuel cell stack 100b, only the first fuel cell stack 100a may operate. Accordingly, when only a small output or a fast maneuver is necessary, the insertion structure 160 shown in FIG. 9B is inserted into the common plate 103, thereby using only the first fuel cell stack 100a.

Figure 10:
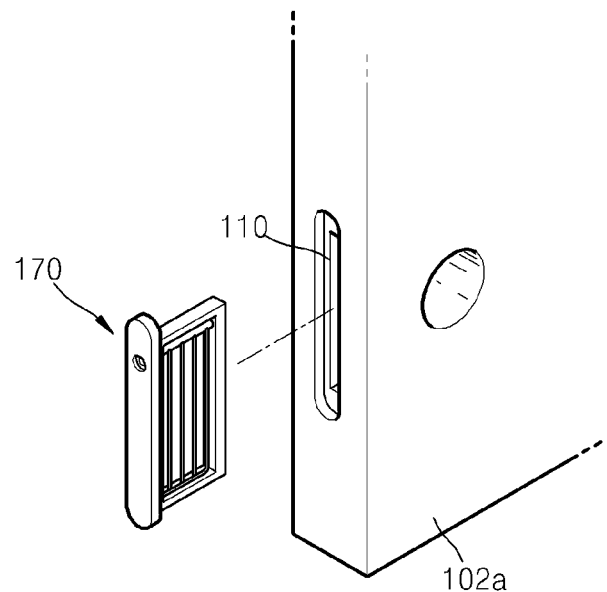
FIG. 10 is a perspective view illustrating another alternative embodiment of the insertion structure detachable from the insertion hole of the end plate of the fuel cell stack of FIG. 1.

FIG. 10 is a perspective view illustrating another alternative embodiment of the insertion structure 170 detachable from the insertion hole 110 of the first end plate 102a of the fuel cell stack 100. In an embodiment, as shown in FIG. 10, the insertion structure 170 may be a supply/removal unit that directly supplies an additional material such as water or a phosphoric acid to fuel or removes the additional material from the fuel.

Figure 11:
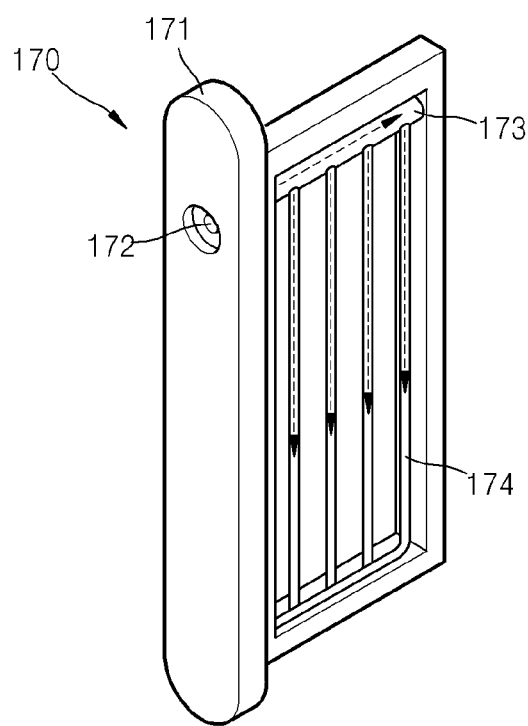
FIG. 11 is a concept view schematically illustrating an operation of the insertion structure of FIG. 10.
Figure 12:
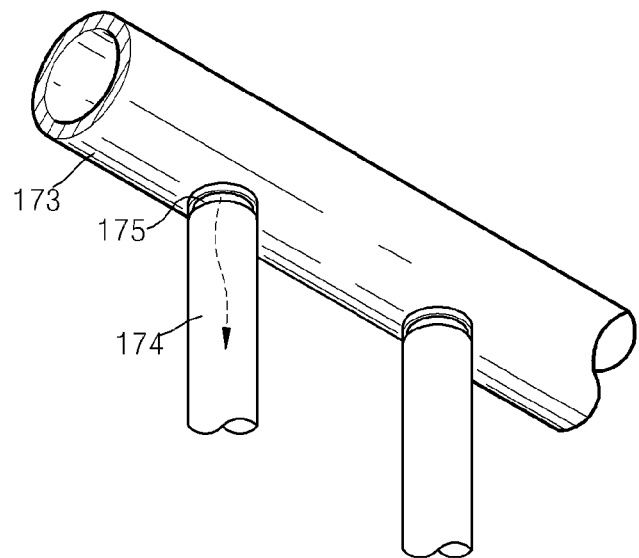
FIG. 12 is a partial enlarged view illustrating a part of the insertion structure of FIG. 1 in detail.

In an embodiment, referring to FIG. 11, the insertion structure 170 may include a frame 171 having substantially the same shape as the inlet of the insertion hole 110, a supply pipe 173, perpendicularly or slantedly extending and protruded from the frame 171, a plurality of guide bars 174 extending longitudinally, e.g., downwardly, from the supply pipe 173, and an inlet 172 defined or formed in the frame 171 to allow a material to be supplied into the supply pipe 173. The inlet 172 and the supply pipe 173 may be disposed to face each other on opposite sides while disposing the frame 171 therebetween. In such an embodiment, as shown in FIG. 12, a micro hole 175 for discharging a material may be defined or formed on a portion of the supply pipe 173 connected to the plurality of guide bars 174. Accordingly, when the insertion structure 170 is installed in the insertion hole 110, the supply pipe 173 and the guide bars 174 may be located in the fuel inlet of the manifold 106 and the inlet 172 may be exposed outward from the side of the first end plate 102a.

In such an embodiment, as described above, the material supplied to the supply pipe 173 through the inlet 172 of the insertion structure 170 may be discharged from the supply pipe 173 through the micro hole 175. The material discharged from the supply pipe 173 flows downwardly along a surface of the guide bar 174. In such an embodiment, the fuel flowing into the manifold 106 passes through the guide bar 174 and is in surface contact with the material flowing along the surface of the guide bar 174. Then, according to the relative partial pressure of the material flowing along the surface of the guide bar 174, an evaporation or condensation amount of the material may be controlled. In one embodiment, for example, when the partial pressure of a material already mixed in the fuel is lower than the partial pressure of the material flowing along the surface of the guide bar 174, the material flowing along the surface of the guide bar 174 evaporates such that the material in the fuel may be additionally supplied. In such an embodiment, when the partial pressure of the material already mixed in the fuel is higher than the partial pressure of the material flowing along the surface of the guide bar 174, the material condenses, thereby removing the material from the fuel.

Figure 13:
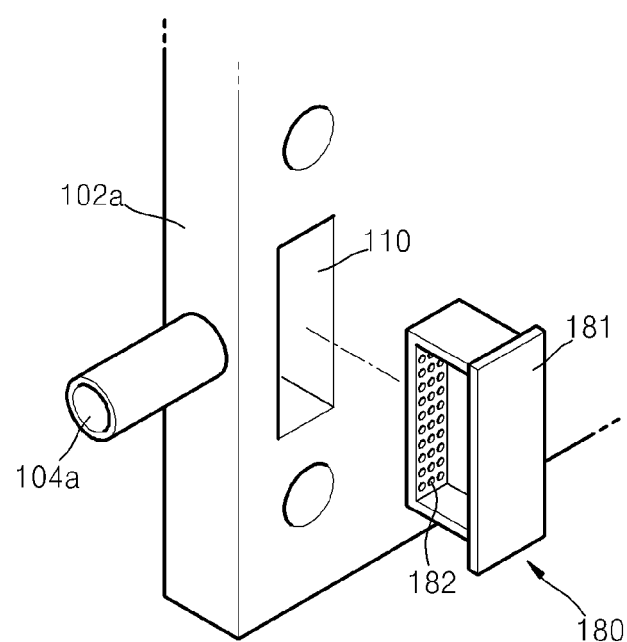
FIG. 13 is a perspective view illustrating an embodiment of an end plate of a fuel cell stack and an embodiment of an insertion structure detachable from an insertion hole of the end plate according to the invention.

FIG. 13 is a perspective view illustrating an embodiment of the first end plate 102a of the fuel cell stack 100 and an embodiment of an insertion structure 180 detachable from the insertion hole 110 of the first end plate 102a, according to the invention. In an embodiment, as shown in FIG. 13, the air supply line 104a may be disposed perpendicularly to the stacking direction of the unit cells 101 and may be connected to the side of the first end plate 102a. In an alternative embodiment, the insertion hole 110 may be defined or formed adjacently to the air supply line 104a in front of the first end plate 102a in the same direction as the stacking direction of the unit cells 101. Accordingly, the front of the manifold 106 of the first end plate 102a may be open outward by the insertion hole 110. In such an embodiment, as described above, the air supplied through the air supply line 104a may be bent at an angle of about 90 degrees and then may be provided to the manifold 106 of the first end plate 102a.

In such an embodiment, the insertion structure 180 inserted into the insertion hole 110 may be open toward the air supply line 104a, an opposite side thereof may be closed, and a flow distribution structure may be disposed toward the manifold (not shown in FIG. 13, refer to the manifold 106 in FIG. 4). In an embodiment, as shown in FIG. 13, the insertion structure 180 may include a frame 181 having substantially the same shape as the inlet of the insertion hole 110 to be inserted into and fastened to the insertion hole 110 and a flow distribution plate 182 through which a plurality of openings are defined or formed, but structure of the flow distribution plate 182 is not limited thereto. In an alternative embodiment, the flow distribution plate 182 may have a different structure such as a mesh structure. When the insertion structure 180 having the structure described above is inserted into the insertion hole 110, the fuel supplied from the side of the first end plate 102a may be changed in a direction at an angle of about 90 degrees, may pass through the flow distribution plate 182, and may flow into the manifold.

Figure 14:
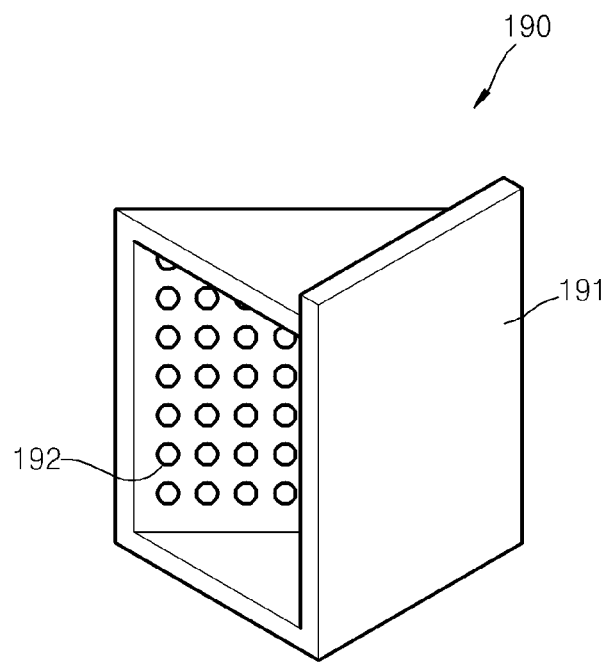
FIG. 14 is a perspective view illustrating an alternative embodiment of the insertion structure detachable from the insertion hole of the end plate of the fuel cell stack of FIG. 13.

In an embodiment, the flow distribution plate 182 is disposed to be perpendicular to a direction, in which the air flows, as shown in FIG. 13, but not being limited thereto. In an alternative embodiment, as shown in FIG. 14, an insertion structure 190 may include a frame 191 having the same shape as the inlet of the insertion hole 110 and a flow distribution plate 192 disposed to be inclined toward a direction, in which the fuel flows. In one embodiment, For example, the flow distribution plate 192 may be inclined at an angle of about 45 degrees toward the air supply line 104a and the manifold 106.

Heretofore, the insertion hole 110 defined or formed adjacently to the air supply line 104a in the first end plate 102a and the insertion structures 120, 130, 140, 170, 180, and 190 inserted into the insertion hole 110 have been described. Such an embodiment may be applied to an insertion hole defined formed adjacently to the air discharge line 104b, the fuel supply line 105a, or the fuel discharge line 105b in the first end plate 102a or an insertion hole defined or formed in the second end plate 102b.

It should be understood that the embodiments described therein should be considered in a descriptive sense only and not for purposes of limitation. Descriptions of features or aspects within each embodiment should typically be considered as available for other similar features or aspects in other embodiments.

While one or embodiments have been described with reference to the figures, it will be understood by those of ordinary skill in the art that various changes in form and details may be made therein without departing from the spirit and scope of the following claims.

What is claimed is:

1. A fuel cell stack comprising:
   a stack comprising a plurality of unit cells, which is stacked on one another in a predetermined direction;
   first and second end plates disposed on opposing ends of the stack in the predetermined direction; and
   a supply line disposed on a first surface of the first end plate to supply fuel or air from an outside to the plurality of unit cells, wherein the fuel or air provided from the supply line to the first end plate is supplied to the plurality of unit cells through the first end plate,
   wherein an insertion hole is defined in a second surface of the first end plate to be adjacent to the supply line,
   wherein the second surface of the first end plate is substantially perpendicular to the first surface of the first end plate, and
   wherein the second surface of the first end plate forms another outer surface of the first end plate such that the insertion hole is accessible from the outside of the fuel cell stack.

2. The fuel cell stack of claim 1, wherein
   the first end plate comprises a manifold connected to the supply line, wherein the manifold functions as a path for the fuel or air, and
   the insertion hole is defined adjacent to the manifold to allow a portion of the manifold to be open outward.

3. The fuel cell stack of claim 2, further comprising:
   an insertion structure configured to be inserted into and detached from the insertion hole, wherein the insertion structure is disposed in the manifold when the insertion structure is inserted into the insertion hole.

4. The fuel cell stack of claim 3, wherein the insertion structure comprises a frame having substantially the same shape as an inlet of the insertion hole to which the insertion structure is inserted and which is fastened to the insertion hole.

5. The fuel cell stack of claim 4, wherein the insertion structure further comprises a linear or plate shaped sealing member disposed on a circumference of the frame to isolate the inside of the fuel cell stack from the outside.

6. The fuel cell stack of claim 4, wherein the insertion structure comprises a flow distributor configured to allow a flow velocity of air or fuel in the manifold to be substantially uniform.

7. The fuel cell stack of claim 6, wherein
the flow distributor comprises:
   a first penetration hole portion extending from the frame to be disposed in the manifold when the insertion structure is inserted into the insertion hole; and
   second penetration hole portions disposed on opposing sides of the first penetration hole portion, respectively,
wherein
the first penetration hole portion has an inlet having a smaller width than an outlet thereof, and
each of the second penetration hole portions has an inlet having a greater width than an outlet thereof.

8. The fuel cell stack of claim 6, wherein the flow distributor has at least one of a mesh structure, a cross-rib structure, a sponge structure, a multi-hole plate structure, and a porous plate structure.

9. The fuel cell stack of claim 6, wherein
the flow distributor comprises:
   a plurality of airfoils fastened to the frame and configured to be rotatable; and
   a control lever for controlling a rotational angle of the plurality of airfoils,
wherein
the plurality of airfoils and the control lever are disposed opposite to each other with the frame disposed therebetween,
the plurality of airfoils is disposed in air or fuel inlet in the manifold when the insertion structure is inserted into the insertion hole, and
the control lever is protruded outwardly from the first end plate.

10. The fuel cell stack of claim 4, wherein
the insertion structure further comprises a material supply/removal unit for directly supplying an additional material to the fuel or removing the additional material from the fuel,
wherein
the material supply/removal unit comprises:
   a supply pipe perpendicularly extending and protrude from the frame;
   a plurality of guide bars extending from the supply pipe in a longitudinal direction of the insertion structure; and
   an inlet defined in the frame to allow a material to be supplied into the supply pipe,
a hole for discharging the material is defined on a portion of the supply pipe connected to the plurality of guide bars, and
the inlet and the supply pipe are disposed to face each other on opposite sides of the frame to allow the supply pipe to be disposed in the manifold and to allow the inlet to be exposed outward from the first end plate when the insertion structure is inserted into the insertion hole.

11. The fuel cell stack of claim 2, wherein
the supply line is disposed substantially perpendicularly to a stacking direction of the unit cells, and
wherein the insertion hole is defined substantially in a same direction as the stacking direction of the unit cells.

12. The fuel cell stack of claim 11, further comprising:
an insertion structure configured to be inserted into and detached from the insertion hole,
wherein
the insertion structure is disposed in the manifold when the insertion structure is inserted into the insertion hole, and
the insertion structure comprises a flow distribution plate disposed to be inclined toward the supply line and the manifold.

13. The fuel cell stack of claim 1, wherein
the first end plate comprises a manifold connected to the supply line, wherein the manifold functions as a path for the fuel or air and, and
a bottom surface or a top surface of the insertion hole is connected to a top surface or a bottom surface of the manifold.

14. The fuel cell stack of claim 13, further comprising:
an insertion structure configured to be inserted into and detached from the insertion hole,
wherein the insertion structure comprises:
   at least two guide slots; and
   at least two fuel distributors configured to be slidable in the at least two guide slots, respectively,
wherein the at least two fuel distributors are disposed in the manifold while sliding to be protruded from the insertion structure when the insertion structure is inserted into the insertion hole, and
wherein each of the at least two fuel distributors comprises a bar-shaped protrusion protruding from the first end plate when the insertion structure is inserted into the insertion hole.

15. The fuel cell stack of claim 1, further comprising:
a common plate disposed between the plurality of unit cells,
wherein the fuel cell stack is divided into a first fuel cell stack comprising a plurality of unit cells between the first end plate and the common plate and a second fuel cell stack comprising a plurality of unit cells between the common plate and the second end plate.

16. The fuel cell stack of claim 15, wherein
the common plate comprises: a channel for transmitting the fuel or air between the first fuel cell stack and the second fuel cell stack, and
an insertion hole is defined in the common plate to be adjacent to the channel on a side of the common plate to allow a side of the channel to be open outward.

17. The fuel cell stack of claim 16, further comprising:
a first insertion structure configured to be inserted into and detached from the insertion hole of the common plate and comprising a penetration hole configured to allow the channel to be open when the first insertion structure is inserted into the insertion hole of the common plate; and a second insertion structure configured to be inserted into and detached from the insertion hole and comprising a barrier configured to allow the channel to be closed when the second insertion structure is inserted into the insertion hole of the common plate.

18. The fuel cell stack of claim 2, wherein the supply line is disposed substantially in a same direction as a stacking direction of the unit cells, and the insertion hole is defined to be substantially perpendicularly to the stacking direction of the unit cells.

19. The fuel cell stack of claim 18, further comprising:

an insertion structure configured to be inserted into and detached from the insertion hole, wherein the insertion structure is disposed in the manifold when the insertion structure is inserted into the insertion hole, wherein the insertion structure comprises a flow distributor disposed to be inclined toward the supply line and the manifold when the insertion structure is inserted into the insertion hole.

20. The fuel cell stack of claim 1, further comprising:

a discharge line disposed on a first surface of the second end plate to discharge the fuel or air from the plurality of unit cells; and an insertion hole defined adjacent to the discharge line on a second surface, which is substantially perpendicularly to the first surface of the second end plate.

\* \* \* \* \*